(12) United States Patent
Konduri et al.

(10) Patent No.: US 8,667,031 B2
(45) Date of Patent: Mar. 4, 2014

(54) REUSE OF SHARED METADATA ACROSS APPLICATIONS VIA URL PROTOCOL

(75) Inventors: Gangadhar Konduri, Mountain View, CA (US); Denny McKinney, Los Altos, CA (US); Siddalingaiah Eraiah, Fremont, CA (US); Edwin Khodabakchian, Atherton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1412 days.

(21) Appl. No.: 12/138,997

(22) Filed: Jun. 13, 2008

(65) Prior Publication Data
US 2009/0313256 A1   Dec. 17, 2009

(51) Int. Cl.
*G06F 7/00* (2006.01)
*G06F 17/30* (2006.01)

(52) U.S. Cl.
USPC .................. 707/825; 707/805; 707/704

(58) Field of Classification Search
USPC .................. 707/913, 805, 825, 704
See application file for complete search history.

(56) References Cited

U.S. PATENT DOCUMENTS

| | | | |
|---|---|---|---|
| 5,790,778 A | 8/1998 | Bush et al. |
| 5,850,518 A | 12/1998 | Northrup |
| 6,117,180 A | 9/2000 | Dave et al. |
| 6,138,270 A | 10/2000 | Hsu |
| 6,397,254 B1 | 5/2002 | Northrup |
| 6,401,134 B1 | 6/2002 | Razavi et al. |
| 6,421,705 B1 | 7/2002 | Northrup |
| 6,442,751 B1 | 8/2002 | Cocchi et al. |
| 6,487,713 B1 | 11/2002 | Cohen et al. |
| 6,546,413 B1 | 4/2003 | Northrup |
| 6,601,233 B1 | 7/2003 | Underwood |
| 6,671,713 B2 | 12/2003 | Northrup |
| 6,671,746 B1 | 12/2003 | Northrup |
| 6,779,000 B1 | 8/2004 | Northrup |
| 6,807,636 B2 | 10/2004 | Hartman et al. |
| 6,901,580 B2 | 5/2005 | Iwanojko et al. |
| 6,922,675 B1 | 7/2005 | Chatterjee et al. |
| 6,922,705 B1 | 7/2005 | Northrup |
| 6,947,992 B1 | 9/2005 | Shachor |
| 7,028,019 B2 | 4/2006 | McMillan et al. |

(Continued)

OTHER PUBLICATIONS

G. Hildebrandt, Web-based Document Management, BTU 2001, pp. 1-21.*

(Continued)

*Primary Examiner* — Kuen Lu
(74) *Attorney, Agent, or Firm* — Kilpatrick Townsend & Stockton LLP

(57) ABSTRACT

Techniques for facilitating the sharing of metadata. In one set of embodiments, a metadata document is referenced by a plurality of software applications as a URL, the URL comprising a protocol component identifying a specialized protocol name and a path component identifying a name and namespace of the metadata document. The specialized protocol name indicates that the metadata document is a shared document stored in a shared metadata repository. When an application in the plurality of software applications needs to access the metadata document, the URL is passed to a URL resolver configured to identify the shared metadata repository based on configuration information associated with the application. The metadata document is then retrieved from the shared metadata repository. Since many existing application framework components and standards are adapted to reference metadata documents as URLs, embodiments of the present invention facilitate metadata reuse with minimal or no code changes to the applications or their underlying framework.

22 Claims, 8 Drawing Sheets

(56) References Cited

U.S. PATENT DOCUMENTS

| | | | |
|---|---|---|---|
| 7,062,749 B2 | 6/2006 | Cyr et al. | |
| 7,086,009 B2 | 8/2006 | Resnick et al. | |
| 7,188,158 B1 | 3/2007 | Stanton et al. | |
| 7,203,938 B2 | 4/2007 | Ambrose et al. | |
| 7,343,360 B1 | 3/2008 | Ristanovic et al. | |
| 7,349,913 B2 | 3/2008 | Clark et al. | |
| 7,535,927 B1 | 5/2009 | Northrup | |
| 7,536,606 B2 | 5/2009 | Andrews et al. | |
| 7,584,207 B2 | 9/2009 | Mortensen et al. | |
| 7,603,674 B2 | 10/2009 | Cyr et al. | |
| 7,644,262 B1 | 1/2010 | Bromley et al. | |
| 7,693,851 B2 * | 4/2010 | Becker | 707/999.1 |
| 7,721,158 B2 | 5/2010 | Lee | |
| 7,774,477 B2 | 8/2010 | Zintel et al. | |
| 7,783,782 B2 | 8/2010 | Cromp et al. | |
| 7,788,338 B2 | 8/2010 | Savchenko et al. | |
| 7,793,340 B2 | 9/2010 | Kiester et al. | |
| 7,827,494 B1 | 11/2010 | Hedayatpour et al. | |
| 7,840,941 B2 | 11/2010 | Brookins et al. | |
| 7,853,899 B1 | 12/2010 | Damaschke et al. | |
| 7,865,544 B2 | 1/2011 | Kordun et al. | |
| 7,895,512 B2 | 2/2011 | Roberts | |
| 7,933,946 B2 | 4/2011 | Livshits et al. | |
| 7,945,907 B2 | 5/2011 | Dreiling et al. | |
| 7,984,424 B2 | 7/2011 | Dengler et al. | |
| 8,015,545 B2 | 9/2011 | Seto et al. | |
| 8,108,825 B2 | 1/2012 | Goodwin et al. | |
| 8,209,675 B2 | 6/2012 | Zhao et al. | |
| 8,538,998 B2 * | 9/2013 | Barrow | 707/802 |
| 2002/0023140 A1 | 2/2002 | Hile et al. | |
| 2002/0103660 A1 | 8/2002 | Cramon et al. | |
| 2002/0129060 A1 | 9/2002 | Rollins et al. | |
| 2002/0143735 A1 | 10/2002 | Ayi et al. | |
| 2002/0147757 A1 | 10/2002 | Day et al. | |
| 2002/0188613 A1 | 12/2002 | Chakraborty et al. | |
| 2003/0005117 A1 | 1/2003 | Kang et al. | |
| 2003/0025732 A1 | 2/2003 | Prichard | |
| 2003/0033310 A1 | 2/2003 | Factor et al. | |
| 2003/0034989 A1 | 2/2003 | Kondo | |
| 2003/0084424 A1 | 5/2003 | Reddy et al. | |
| 2003/0088857 A1 | 5/2003 | Salva et al. | |
| 2003/0172127 A1 | 9/2003 | Northrup | |
| 2003/0172168 A1 | 9/2003 | Mak et al. | |
| 2003/0172193 A1 | 9/2003 | Olsen | |
| 2003/0192031 A1 | 10/2003 | Srinivasan et al. | |
| 2003/0204518 A1 | 10/2003 | Lang et al. | |
| 2003/0204645 A1 | 10/2003 | Sharma et al. | |
| 2003/0233631 A1 | 12/2003 | Curry et al. | |
| 2003/0233642 A1 | 12/2003 | Hank | |
| 2004/0046787 A1 | 3/2004 | Henry et al. | |
| 2004/0046789 A1 | 3/2004 | Inanoria | |
| 2004/0054991 A1 | 3/2004 | Harres | |
| 2004/0073565 A1 | 4/2004 | Kaufman et al. | |
| 2004/0078424 A1 | 4/2004 | Yairi et al. | |
| 2004/0111533 A1 | 6/2004 | Beisiegel et al. | |
| 2004/0111673 A1 | 6/2004 | Bowman et al. | |
| 2004/0148588 A1 | 7/2004 | Sadiq | |
| 2004/0181534 A1 | 9/2004 | Mortensen et al. | |
| 2004/0194016 A1 | 9/2004 | Liggitt | |
| 2004/0205117 A1 | 10/2004 | Hertling et al. | |
| 2004/0205765 A1 | 10/2004 | Beringer et al. | |
| 2004/0230639 A1 | 11/2004 | Soluk et al. | |
| 2005/0044197 A1 | 2/2005 | Lai | |
| 2005/0183074 A1 | 8/2005 | Alexander et al. | |
| 2005/0193061 A1 | 9/2005 | Schmidt et al. | |
| 2005/0223361 A1 | 10/2005 | Belbute | |
| 2005/0251788 A1 | 11/2005 | Henke et al. | |
| 2005/0273772 A1 | 12/2005 | Matsakis et al. | |
| 2006/0010163 A1 | 1/2006 | Herzog et al. | |
| 2006/0015847 A1 | 1/2006 | Carroll, Jr. | |
| 2006/0031750 A1 | 2/2006 | Waldorf et al. | |
| 2006/0036463 A1 | 2/2006 | Patrick et al. | |
| 2006/0075387 A1 | 4/2006 | Martin et al. | |
| 2006/0080117 A1 | 4/2006 | Carr et al. | |
| 2006/0101038 A1 | 5/2006 | Gabriel et al. | |
| 2006/0106626 A1 | 5/2006 | Jeng et al. | |
| 2006/0130047 A1 | 6/2006 | Burugapalli | |
| 2006/0136832 A1 | 6/2006 | Keller et al. | |
| 2006/0143229 A1 | 6/2006 | Bou-Ghannam et al. | |
| 2006/0150156 A1 | 7/2006 | Cyr et al. | |
| 2006/0165105 A1 | 7/2006 | Shenfield et al. | |
| 2006/0168132 A1 | 7/2006 | Bunter et al. | |
| 2006/0168355 A1 | 7/2006 | Shenfield et al. | |
| 2006/0168557 A1 | 7/2006 | Agrawal et al. | |
| 2006/0184866 A1 * | 8/2006 | Rees | 715/500 |
| 2006/0206858 A1 | 9/2006 | Becker et al. | |
| 2006/0235733 A1 | 10/2006 | Marks | |
| 2006/0235986 A1 | 10/2006 | Kim | |
| 2006/0242636 A1 | 10/2006 | Chilimbi et al. | |
| 2006/0253490 A1 | 11/2006 | Krishna et al. | |
| 2006/0265702 A1 | 11/2006 | Isaacson et al. | |
| 2006/0271537 A1 | 11/2006 | Chandrasekharan et al. | |
| 2006/0277542 A1 | 12/2006 | Wipfel | |
| 2006/0294474 A1 | 12/2006 | Taylor et al. | |
| 2006/0294506 A1 | 12/2006 | Dengler et al. | |
| 2007/0016429 A1 | 1/2007 | Bournas et al. | |
| 2007/0055936 A1 | 3/2007 | Dhanjal et al. | |
| 2007/0106975 A1 | 5/2007 | Deline | |
| 2007/0113191 A1 | 5/2007 | Keller et al. | |
| 2007/0130205 A1 | 6/2007 | Dengler et al. | |
| 2007/0157078 A1 | 7/2007 | Anderson | |
| 2007/0169199 A1 | 7/2007 | Quinnell et al. | |
| 2007/0174763 A1 | 7/2007 | Chang et al. | |
| 2007/0174822 A1 | 7/2007 | Moser et al. | |
| 2007/0203956 A1 | 8/2007 | Anderson et al. | |
| 2007/0220429 A1 | 9/2007 | Kureshy et al. | |
| 2007/0240096 A1 | 10/2007 | Pontoppidan et al. | |
| 2007/0245340 A1 | 10/2007 | Cohen et al. | |
| 2007/0271552 A1 | 11/2007 | Pulley | |
| 2007/0277095 A1 | 11/2007 | Ukigawa | |
| 2007/0282885 A1 | 12/2007 | Baude et al. | |
| 2007/0294586 A1 | 12/2007 | Parvathy et al. | |
| 2007/0294664 A1 | 12/2007 | Joshi | |
| 2008/0004887 A1 | 1/2008 | Brunswig et al. | |
| 2008/0028302 A1 | 1/2008 | Meschkat | |
| 2008/0065675 A1 | 3/2008 | Bozich et al. | |
| 2008/0077848 A1 | 3/2008 | Roberts | |
| 2008/0083012 A1 | 4/2008 | Yu et al. | |
| 2008/0104617 A1 | 5/2008 | Apacible et al. | |
| 2008/0120557 A1 | 5/2008 | Offenhartz et al. | |
| 2008/0126396 A1 | 5/2008 | Gagnon | |
| 2008/0127087 A1 | 5/2008 | Brookins et al. | |
| 2008/0127124 A1 | 5/2008 | Gilfix et al. | |
| 2008/0162304 A1 | 7/2008 | Ourega | |
| 2008/0163164 A1 | 7/2008 | Chowdhary et al. | |
| 2008/0183479 A1 | 7/2008 | Iwashita et al. | |
| 2008/0183744 A1 | 7/2008 | Adendorff et al. | |
| 2008/0184201 A1 | 7/2008 | Burns et al. | |
| 2008/0189358 A1 | 8/2008 | Charles | |
| 2008/0189617 A1 * | 8/2008 | Covell et al. | 715/738 |
| 2008/0196024 A1 | 8/2008 | Barfield et al. | |
| 2008/0243901 A1 | 10/2008 | Super et al. | |
| 2008/0250313 A1 | 10/2008 | Kamdar et al. | |
| 2008/0275844 A1 | 11/2008 | Buzsaki et al. | |
| 2008/0276218 A1 | 11/2008 | Taylor et al. | |
| 2008/0276260 A1 | 11/2008 | Garlick et al. | |
| 2008/0295109 A1 | 11/2008 | Huang et al. | |
| 2008/0313648 A1 | 12/2008 | Wang et al. | |
| 2009/0031280 A1 | 1/2009 | Koehler | |
| 2009/0083297 A1 | 3/2009 | Pohl et al. | |
| 2009/0106494 A1 | 4/2009 | Knebel | |
| 2009/0144716 A1 | 6/2009 | Felts | |
| 2009/0144729 A1 | 6/2009 | Guizar | |
| 2009/0150565 A1 | 6/2009 | Grossner et al. | |
| 2009/0157859 A1 * | 6/2009 | Morris | 709/223 |
| 2009/0158237 A1 | 6/2009 | Zhang et al. | |
| 2009/0178020 A1 | 7/2009 | Goodwin et al. | |
| 2009/0204567 A1 | 8/2009 | Barrow | |
| 2009/0204629 A1 | 8/2009 | Barrow | |
| 2009/0204884 A1 | 8/2009 | Barrow et al. | |
| 2009/0204943 A1 | 8/2009 | Konduri | |
| 2009/0205013 A1 | 8/2009 | Lowes | |
| 2009/0217153 A1 | 8/2009 | Oshima et al. | |
| 2009/0259993 A1 | 10/2009 | Konduri et al. | |

(56) References Cited

U.S. PATENT DOCUMENTS

| | | |
|---|---|---|
| 2009/0292797 A1 | 11/2009 | Cromp et al. |
| 2010/0057482 A1 | 3/2010 | Radhakrishnan et al. |
| 2010/0057836 A1 | 3/2010 | Anbuselvan |
| 2010/0070553 A1 | 3/2010 | Addala et al. |
| 2010/0070973 A1 | 3/2010 | Addala et al. |
| 2010/0082556 A1 | 4/2010 | Srinivasan et al. |
| 2010/0132009 A1 | 5/2010 | Khemani et al. |
| 2010/0146291 A1 | 6/2010 | Anbuselvan |
| 2010/0313038 A1 | 12/2010 | Bradley |
| 2011/0023071 A1 | 1/2011 | Li et al. |
| 2011/0119649 A1 | 5/2011 | Kand et al. |
| 2011/0119651 A1 | 5/2011 | Utschig-Utschig et al. |

OTHER PUBLICATIONS

U.S. Appl. No. 12/790,437, filed May 28, 2010, Utschig-Utschig et al.
U.S. Appl. No. 12/791,445, filed May 28, 2010, Kand et al.
Beisiegel, et al., "SCA Service Component Architecture—Assembly Model Specification," Mar. 15, 2007, SCA version 1.00, 91 pages, BEA Systems, Inc.
"Business Process Language (BPEL) and Oracle BPEL Process Manager," Oracle FAQ, updated Jun. 26, 2004, printed on Nov. 11, 2009, at URL: http://www.oracle.com/technology/products/ias/bpel/htdocs/orabpel_faq.html?_template= . . . , 3 pages.
Chapman, et al., "SCA Service Component Architecture—Client and Implementation Model Specification for WS-BPEL," Mar. 21, 2007, SCA version 1.00, 15 pages, BEA Systems, Inc.
Chappell, "Introducing SCA," David Chappell & Associates, Jul. 2007, pp. 1-22.
CipherSoft Inc, "Exodus—Main Features Benefits" Products, at URL: http://www.ciphersoftinc.com/products/expdus-features-benefits.html; printed on Aug. 28, 2009; 3 pages.
CipherSoft Inc, "Exodus™ Products," printed on Aug. 28, 2009, at URL: http://www.ciphersoftinc.com/products/migration-products-overview.html; 3 pages.
"Client-Server Modernization—From Oracle® Forms to Java," VGO Software Products, printed on Aug. 28, 2009, at URL: http://www.vgosoftware.com/products/evo/index.php; 2 pages.
Dynamic Structure in ADF UIX Pages, from Oracle ADF UIX Developer's Guide, pp. 1-11 downloaded from http://www.oracle.com/webapps/online-help/jdeveloper/10.1.2/state/content/navId.4/navSetId._/vtAnchor.DeltaTree/vtTopicFile.uixhelp%7Cuixdevguide%7Cdynamic%7Ehtml/ on Apr. 21, 2008.
"Oracle Forms to Java Modernization" printed on Aug. 28, 2009, at URL: http://www.vgosoftware.com/products/evo/walkthrough.php; VGO Software Information printed 5 pages.
Shepherd, et al., "Oracle SCA—The Power of the Composite," An Oracle White Paper, Aug. 2009, pp. 1-19, Oracle.
"Vgo Software First to Convert Oracle Forms to Oracle ADF V11"; VGO News, printed on Aug. 28, 2009; at URL: http://www.vgosoftware.com/about/news/view_article.php?new_id=35; 2 pages.
Non-Final Office Action for U.S. Appl. No. 12/029,605, mailed on May 12, 2010, 13 pages.
Final Office Action for U.S. Appl. No. 12/029,605, mailed on Sep. 28, 2010, 15 pages.
Non-Final Office Action for U.S. Appl. No. 12/029,609, mailed on May 26, 2010, 17 pages.
Final Office Action for U.S. Appl. No. 12/029,609, mailed on Oct. 13, 2010, 14 pages.
Non-Final Office Action for U.S. Appl. No. 12/203,816, mailed on Sep. 2, 2010, 18 pages.
Zhang, et al., "Schema Based XML Security: RBAC Approach," Machine Simulator, Third International Conference on Computer Assisted Learning, Published 2003, at URL: http://citeseerx.ist.psu.edu/viewdoc/summary?doi=10.1.1.3.6016, pp. 1-15.
Non-Final Office Action for U.S. Appl. No. 12/029,724, mailed on Dec. 14, 2010, 43 pages.
Smith, Portals: Toward an Application Framework for Interoperability,: Communications of the ACM, Oct. 2004, vol. 47, No. 10, pp. 93-97.
Phanouriou, "UIML: A Device-Independent User Interface Markup Language," Doctoral Dissertation, Virginia Polytechnic Institute and State University, Sep. 26, 2000, 172 pages.
"File and Registry Virtualization—the good, the bad, and the ugly," Jerry's Incoherent Babbling; Windows Connected Blog; Published Dec. 19, 2005; at URL: http://windowsconnected.com/blogs/jerry/archive/2005/12/19/file-and-registry-virtualization-the-good-the-bad-and-t . . . ; 6 pages.
Non-Final Office Action for U.S. Appl. No. 12/029,600, mailed on Apr. 27, 2011, 216 pages.
Final Office Action for U.S. Appl. No. 12/029,724, mailed on May 5, 2011, 27 pages.
Final Office Action for U.S. Appl. No. 12/203,816, mailed on Jan. 20, 2011, 26 pages.
Notice of Allowance for U.S. Appl. No. 12/210,657 mailed on Jun. 26, 2012, 6 pages.
Notice of Allowance for U.S. Appl. No. 12/330,008 mailed on Jun. 11, 2012, 7 pages.
Final Office Action for U.S. Appl. No. 12/029,615 mailed on Jul. 31, 2012, 33 pages.
Notice of Allowance for U.S. Appl. No. 12/330,008 mailed on Aug. 7, 2012, 17 pages.
Mietzner, et al., "Defining Composite Configurable SaaS Application Packages Using SCA Variability Descriptors and Multi-Tenancy Patterns,", 2008, pp. 156-161.
"Phillips, Josh. Window's Connected UseriD: Jerry. Jerry's Incoherent Babbling: ""File and Registry Virtualization—the good, the bad, and the ugly""". <http:/ /wi ndowsco n nected. co m/b logs/jerry/arch ive/2005/ 12/1 9/fi l e-and-reg istry-vi rtual izatio n-th e-good-th ebad- and-the-ugly.aspx>. Published: Dec. 19, 2005."
Non-Final Office Action for U.S. Appl. No. 12/203,816 mailed on Oct. 26, 2012 30 pages.
Non-Final Office Action for U.S. Appl. No. 12/029,724 mailed on Jan. 7, 2013, 39 pages.
Final Office Action for U.S. Appl. No. 12/029,724 mailed on Apr. 30, 2013, 33 pages.
Terminal Disclaimer—Approved for U.S. Appl. No. 12/029,600 mailed on Oct. 25, 2011, 1 page.
Non-Final Office Action for U.S. Appl. No. 12/029,600 mailed on Sep. 17, 2012, 38 pages.
Notice of Allowance for U.S. Appl. No. 12/029,600 mailed on Nov. 7, 2012, 16 pages.
Notice of Allowance for U.S. Appl. No. 12/029,600 mailed on Feb. 5, 2013, 16 pages.
Non-Final Office Action for U.S. Appl. No. 12/029,605 mailed on Apr. 10, 2013, 38 pages.
Non-Final Office Action for U.S. Appl. No. 12/029,609 mailed on Jul. 28, 2011, 29 pages.
Notice of Allowance for U.S. Appl. No. 12/029,609 mailed on Feb. 4, 2013, 52 pages.
Non-Final Office Action for U.S. Appl. No. 12/212,599 mailed on Aug. 2, 2012, 18 pages.
Advisory Action for U.S. Appl. No. 12/487,004 mailed on May 24, 2012, 5 pages.
Advisory Action for U.S. Appl. No. 12/029,615 mailed on Oct. 16, 2012, 5 pages.
Non-Final Office Action for U.S. Appl. No. 12/790,437 mailed on Jan. 30, 2013, 31 pages.
Non-Final Office Action for U.S. Appl. No. 12/790,445 mailed on Dec. 19, 2012, 30 pages.
Claessens, J., et al., "A Tangled World Web of Security Issues." First Monday vol. 7, No. 3-4, (Mar. 2002): 24 pages. Web. Jun. 25, 2013.
Final Office Action for U.S. Appl. No. 12/203,816 mailed on Jul. 5, 2013, 25 pages.
Notice of Allowance for U.S. Appl. No. 12/029,600 mailed on Jun. 11, 2013, 10 pages.
Notice of Allowance for U.S. Appl. No. 12/029,609 mailed on May 29, 2013, 14 pages.
Notice of Allowance for U.S. Appl. No. 12/212,599 mailed on Jun. 19, 2013, 6 pages.

(56) References Cited

OTHER PUBLICATIONS

Final Office Action for U.S. Appl. No. 12/790,437 mailed on Jul. 12, 2013, 12 pages.
Final Office Action for U.S. Appl. No. 12/790,445 mailed on Jul. 5, 2013, 10 pages.
U.S. Appl. No. 13/360,127, filed Jan. 27, 2012 by Krishnamurthy et al.
"AJAX & Security: Vulnerability in DWR Security Logic Identified Can Potentially be exploited to launce DoS attacks and break into back-end servers", published Jan. 8, 2007, AjaxWorld™ Magazine, pp. 1-4 downloaded on Oct. 6, 2008 from http://ajax.sys-con.com/node/319868, 4 pages.
"Direct Web Remoting, About DWR's Javascript Security", 4 pages downloaded from http://directwebremoting.org/dwr/security/script-tag-protection on Oct. 6, 2008.
"Direct Web Remoting, DWR version 2—New and Noteworthy", 4 pages downloaded from http://directwebremoting.org/dwr/changelog/dwr20 on Dec. 5, 2008.
"Direct Web Remoting, DWR: Easy AJAX for JAVA", 2 pages downloaded from http://directwebremoting.org/dwr/overview/dwr on Oct. 6, 2008.
"Direct Web Remoting, Safari, GET and Request Forgery", 1 page downloaded from http://directwebremoting.org/dwr/security/allowGetForSafariButMakeForgeryEasier on Oct. 6, 2008.
"Direct Web Remoting, Security", 4 pages downloaded from http://directwebremoting.org/dwr/security on Oct. 6, 2008.
"Google Web Toolkit, Product Overview", 3 pages downloaded from http://code.google.com/webtoolkit/overview.html on Oct. 6, 2008.
"Oracle Application Framework", Oracle, Dec. 2006, pp. 1-242, 242 pages.
Altenhofen et al., "ASMs in Service Oriented Architectures", Journal of Universal Computer Science, vol. 14, No. 12, 2008, 25 pages.
Box et al., "Web Services Addressing (WS-Addressing)" Aug. 10, 2004, 23 pages, http://www.w3.org/Submission/ws-addressing/#_Toc77464317 printed on Aug. 18, 2009, 23 pages.
Carey, "Making BPEL Processes Dynamic" Oracle Technology Network, 8 pages, printed on Aug. 18, 2009, 8 pages.
Claypool et al., "Optimizing Performance of Schema Evolution Sequences", Objects and Databases [online], 2000 [retrieved Feb. 7, 2012], retrieved from Internet: http://se-pubs.dbs.uni-leipzig.de/files/Claypool2000OptimizingPerformanceofSchemaEvolutionSequences.pdf, pp. 114-127, 14 pages.
Curphey et al., "Web Application Security Assessment Tools", IEEE, 2006, pp. 32-41, 10 pages.
Dipaola et al., "Subverting Ajax", Dec. 2006, 23rd CCC Conference, pp. 1-8, 8 pages.
Hohpe et al., "Messaging Systems" Enterprise Integration Patterns 2004, pp. 57-97, Chapter 3, Pearson Education, Inc, Boston, Massachusetts, 45 pages.
Nagappan et al., "XML Processing and Data Binding with Java APIs" in: Developing Java Web Services: Architecting and Developing Secure Web Services Using Java [online], 2003 [retrieved Feb. 7, 2012], retrieved from Internet: http://java.sun.com/developer/Books/j2ee/devjws/, pp. 313-399, 89 pages.
Steinberg, "Data Binding with JAXB" [online], 2003 [retrieved Feb. 7, 2012], retrieved from Internet: https://www6.software.ibm.com/developerworks/education/x-jabx/x-jaxb-a4.pdf, pp. 1-34, 34 pages.
Shang-Pin Ma, "Discovery-Based Service Composition," National Central University, Doctoral Dissertation. Jan. 2007, 109 pages.
Yang et al., "Web Component: A Substrate for Web Service Reuse and Composition". Proc. 14th Conf. Advanced Information Systems Eng. (CAiSE 02), LNCS 2348, Springer-Verlag, 2002, 16 pages.
Non-Final Office Action for U.S. Appl. No. 12/210,657 mailed on Apr. 25, 2011, 21 pages.
Non-Final Office Action for U.S. Appl. No. 12/210,657 mailed on Sep. 30, 2011, 21 pages.
Non-Final Office Action for U.S. Appl. No. 12/212,599 mailed on Dec. 22, 2011, 10 pages.
Non-Final Office Action for U.S. Appl. No. 12/330,008 mailed on Dec. 21, 2011, 14 pages.
Non-Final Office Action for U.S. Appl. No. 12/029,615 mailed on Feb. 15, 2012, 27 pages.
Final Office Action for U.S. Appl. No. 12/101,420 mailed on Feb. 24, 2012, 20 pages.
Final Office Action for U.S. Appl. No. 12/487,004 mailed on Mar. 19, 2012, 30 pages.
Final Office Action for U.S. Appl. No. 12/210,657 mailed on Apr. 3, 2012, 23 pages.
Final Office Action for U.S. Appl. No. 12/330,008 mailed on Apr. 10, 2012, 13 pages.
Final Office Action for U.S. Appl. No. 12/029,600 mailed on Oct. 19, 2011, 20 pages.
Final Office Action for U.S. Appl. No. 12/029,605 mailed on Nov. 2, 2011, 13 pages.
Final Office Action for U.S. Appl. No. 12/029,609 mailed on Nov. 8, 2011, 13 pages.
Non-Final Office Action for U.S. Appl. No. 12/101,420 mailed on Oct. 5, 2011, 18 pages.
Non-Final Office Action for U.S. Appl. No. 12/029,605 mailed on Jul. 20, 2011, 12 pages.

* cited by examiner

REUSE OF SHARED METADATA ACROSS APPLICATIONS VIA URL PROTOCOL

BACKGROUND OF THE INVENTION

Embodiments of the present invention relate to computer software, and more particularly relate to techniques for facilitating the sharing of metadata by a plurality of software applications.

In recent years, an increasing number of software applications are being built using a metadata-driven approach. These applications (referred to herein as metadata-driven applications) are structured such that aspects of their content, behavior, and/or appearance are specified via metadata rather than program code. For example, Service-Oriented Architecture (SOA) applications typically rely on data and services that are defined using Extensible Markup Language (XML) based metadata (e.g., Web Services Description Language (WSDL) documents, XML Schema Definition (XSD) documents, etc.).

Large-scale software applications or application suites (such as the Oracle E-Business Suite developed by Oracle Corporation) may include a number of metadata-driven applications or application components that make use of the same metadata. For instance, the applications may use one or more common metadata documents that describe a standard user interface layout, standard data types, or the like. In these situations, the common metadata should be made available to all of the applications in some manner.

According to one approach, such common metadata can be made available to applications by simply duplicating the metadata in each application. Unfortunately, this approach is problematic for several reasons. For example, since each application must include its own, separate copy of the common metadata, problems may occur where applications are accidentally deployed with mismatched metadata versions, resulting in incorrect runtime behavior. Further, maintaining duplicate versions of metadata is inefficient and cumbersome. For example, the size of each application will be larger than necessary because of the duplicated metadata, and any modifications to the metadata will require updates to each duplicated copy.

According to another approach, the common metadata can be stored in a centralized location, and the various applications can retrieve the single, shared copy using proprietary means (i.e., means that do not leverage any standard access mechanisms such as Uniform Resource Locators (URLs)). While this method overcomes some of the difficulties related to duplicating common metadata, this method still has several shortcomings. For instance, each application will have to implement proprietary code for accessing the shared copy of the metadata, rendering the application incompatible with a large number of existing application framework components and standards (e.g., development tools, XML processors, WSDL, etc.) that are adapted to reference metadata documents as URLs.

BRIEF SUMMARY OF THE INVENTION

Embodiments of the present invention address the foregoing and other such problems by providing techniques for facilitating the sharing of a metadata document by a plurality of software applications via URL protocol. In one set of embodiments, the metadata document is referenced by the plurality of software applications as a URL, the URL comprising a protocol component identifying a specialized protocol name and a path component identifying a name and namespace of the metadata document. The specialized protocol name indicates that the metadata document is a shared document stored in a shared metadata repository. When an application in the plurality of software applications needs to access the metadata document, the URL is passed to a URL resolver configured to identify the shared metadata repository based on configuration information associated with the application. The metadata document is then retrieved from the shared metadata repository. Since many existing application framework components and standards are adapted to reference metadata documents as URLs, embodiments of the present invention facilitate metadata reuse with minimal or no code changes to the applications or their underlying framework.

According to one embodiment of the present invention, a method for facilitating the sharing of a metadata document by a plurality of software applications comprises receiving, from a software application in the plurality of software applications, a URL for the metadata document, the URL including a protocol component identifying a specialized protocol name and a path component identifying a name and namespace of the metadata document. The specialized protocol name indicates that the metadata document is a shared document stored in a shared metadata repository. The shared metadata repository is then identified based on configuration information associated with the software application and (optionally) the namespace of metadata document.

In one set of embodiments, the metadata document is subsequently retrieved from the shared metadata repository. In another set of embodiments, a domain name for the shared metadata repository is determined, and the URL is transformed into a HyperText Transfer Protocol (HTTP) URL based on the domain name. The HTTP URL enables applications to retrieve the metadata document using standard HTTP protocol.

In various embodiments, the steps of receiving the URL and identifying the shared metadata repository are performed by a URL resolver configured to interoperate with a URL technology component. The URL technology component is a standard application framework component adapted to process URLs on behalf of the plurality of software applications. In one embodiment, the software applications are J2EE applications, the URL technology component is a standard Java URL class, and the URL resolver is a custom Java class that extends the standard Java URL class.

In one set of embodiments, the steps of receiving the URL and identifying the shared metadata repository are performed while the software application is running in a deployed environment. In these embodiments, the shared metadata repository may be a database repository. In another set of embodiments, the steps of receiving the URL and identifying the shared metadata repository may be performed while the software application is running in a development environment. In these embodiments, the configuration information may be associated with the development environment rather than the software application. Further, the shared metadata repository may be a file-based repository.

In some embodiments, the configuration information may include version information indicating a specific version of the metadata document used by the software application. For example, each application in the plurality of software applications may use a different version of the metadata document. In these embodiments, retrieving the metadata document comprises retrieving the specific version. In further embodiments, the configuration information may include customization information indicating a specific customized variant of the metadata document used by the software application. For example, each application in the plurality of software applications may use a different customization for the metadata document. In these embodiments, retrieving the metadata document comprises retrieving the specific customized variant. The concept of metadata customizations is discussed in greater detail in U.S. patent application Ser. Nos. 12/029,600, 12/029,605, 12/029,609, 12/029,615, and 12/029,724, assigned to Oracle Corporation, which are hereby incorporated by reference in their entireties for all purposes.

According to another embodiment of the present invention, a system for facilitating the sharing of a metadata document by a plurality of software applications is provided. The system comprises a standard URL technology component adapted to process URLs on behalf of the plurality of software applications, and a custom URL resolver in communication with the URL technology component. In various embodiments, the custom URL resolver is configured to receive, from a software application in the plurality of software applications via the URL technology component, a URL for the metadata document, the URL including a protocol component identifying a specialized protocol name and a path component identifying a name and namespace of the metadata document. The specialized protocol name indicates that the metadata document is a shared metadata document stored in a shared metadata repository. The custom URL resolver is further configured to identify the shared metadata repository based on configuration information associated with the software application and (optionally) the namespace of the metadata document. In various embodiments, the metadata document may then be retrieved from the shared metadata repository. Alternatively, a domain name for the shared metadata repository may be determined, and the URL may be transformed into a HyperText Transfer Protocol (HTTP) URL based on the domain name.

According to yet another embodiment of the present invention, a machine-readable medium for a computer system is disclosed. The machine-readable medium has stored thereon a series of instructions which, when executed by a processing component, cause the processing component to receive, from a software application in a plurality of software applications, a URL for a metadata document, the URL including a protocol component identifying a specialized protocol name and a path component identifying a name and namespace of the metadata document. The specialized protocol name indicates that the metadata document is a shared metadata document stored in a shared metadata repository. The series of instructions further cause the processing component to identify the shared metadata repository based on configuration information associated with the software application and (optionally) the namespace of the metadata document. In various embodiments, the metadata document may then be retrieved from the shared metadata repository. Alternatively, a domain name for the shared metadata repository may be determined, and the URL may be transformed into a HyperText Transfer Protocol (HTTP) URL based on the domain name.

A further understanding of the nature and advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which.

In the drawings, the use of like reference numbers in different drawings indicates similar components.

DETAILED DESCRIPTION OF THE INVENTION

Figure 1:
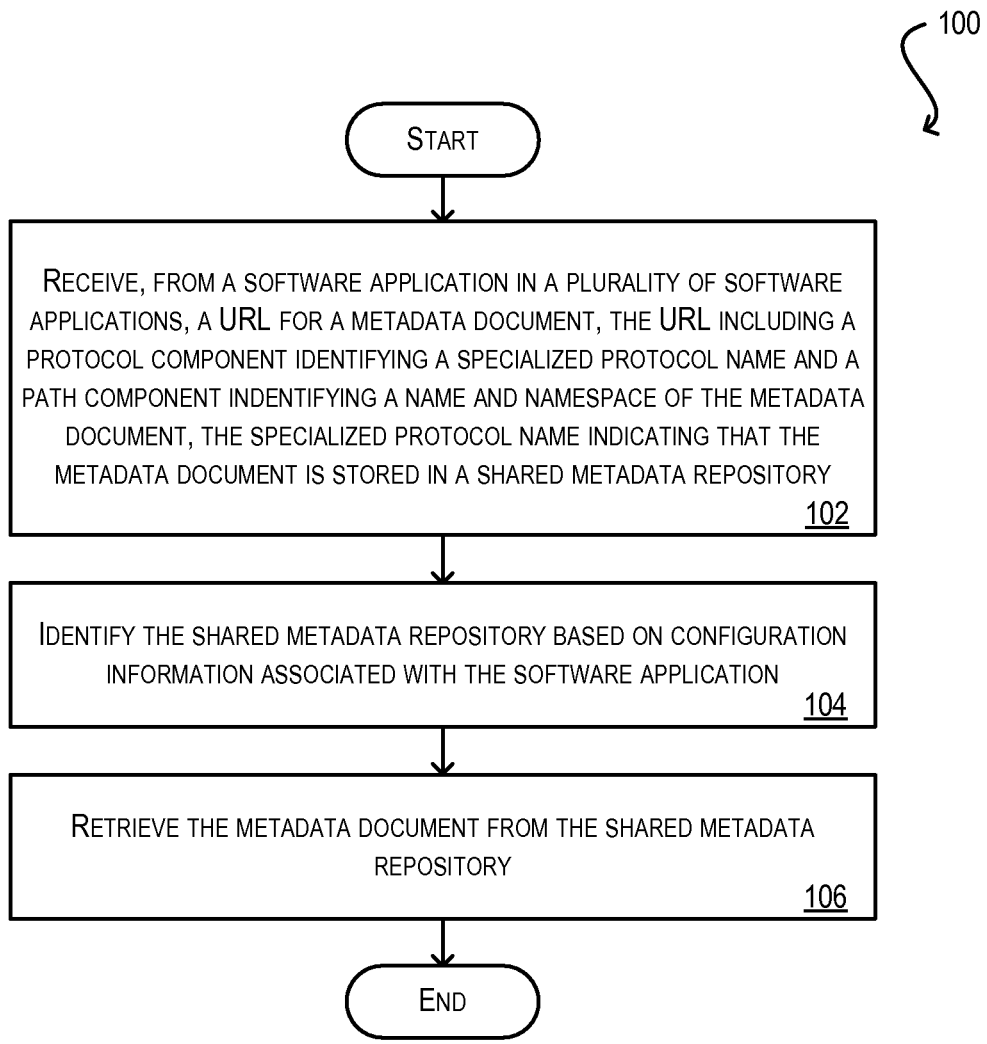
FIG. 1 is a flowchart illustrating steps performed in facilitating the sharing of metadata in accordance with an embodiment of the present invention.

In the following description, for the purposes of explanation, numerous specific details are set forth in order to provide an understanding of the present invention. It will be apparent, however, to one skilled in the art that the present invention may be practiced without some of these specific details.

Embodiments of the present invention provide techniques for facilitating the sharing of a metadata document by a plurality of software applications. As described in further detail below, this sharing is achieved by having each application reference the metadata document using a specific type of URL. This URL includes a protocol component identifying a specialized protocol name (e.g., "oraclemds") and a path component identifying a name and namespace of the metadata document. The specialized protocol name indicates that the metadata document is a shared document stored in a shared metadata repository. When an application needs to resolve the URL (i.e., determine the location of the metadata document), the URL is passed to a URL resolver integrated into the underlying application framework of the plurality of software applications. The URL resolver identifies the shared metadata repository based on configuration information associated with the application, as well as (optionally) the namespace of the metadata document. The metadata document is then retrieved from the metadata repository. In situations where the URL needs to be published for external consumption, the URL may be transformed into a standard HTTP URL.

Since embodiments of the present invention allow common metadata to be centralized at a single, shared location, the problems associated with duplicating metadata in different applications are minimized or avoided. Further, since the present techniques use URLs as metadata references, these techniques may be used in conjunction with existing application framework components and standards (e.g., development tools, XML processors, WSDL, etc.) that are adapted to reference metadata documents as URLs.

In some embodiments, the configuration information associated with each application may include additional information that is used by the URL resolver to retrieve the shared metadata document. For example, the configuration information may include version information indicating a specific version of the metadata document used by an application. Additionally, the configuration information may include customization information indicating a specific customization for the metadata document used by an application.

Embodiments of the present invention may be used in a variety of different domains and contexts. Certain embodiments are particularly applicable to enterprise software applications, which are often configured to make use of common metadata. However, embodiments of the present invention may be used to facilitate the sharing of metadata by any type of software application. Further, the sharing techniques described herein may be used throughout the lifecycle of a software application. For example, the sharing techniques may be used to facilitate metadata reuse during application development, testing, and deployment.

FIG. 1 is a flowchart 100 illustrating steps performed in facilitating the sharing of a metadata document by a plurality of software applications in accordance with an embodiment of the present invention. In various embodiments, the processing of flowchart 100 may be implemented in software, hardware, or combinations thereof. For example, as software, flowchart 100 may be implemented as part of a URL resolver configured to resolve URLs on behalf of the plurality of applications. Further, such software may be stored on a machine-readable medium. An example a URL resolver is discussed in greater detail below with respect to FIG. 3.

At step 102, a URL for a metadata document is received from a software application in the plurality of software applications. The URL includes a protocol component identifying a specialized protocol name, such as "oraclemds." The specialized protocol name indicates that the metadata document referenced by the URL is a shared document that is stored in a shared metadata repository. In various embodiments, the specialized protocol name is a unique name that is different from any standard or well-known URL protocol, such as HTTP, FTP, or the like. The URL also includes a path component identifying a name and namespace for the metadata document. An example of such a URL is "oraclemds://soa/shared/workflow/taskservice.wsdl," where the protocol component is "oraclemds://" and the path component is "soa/shared/workflow/taskservice.wsdl."

At step 104, the URL is recognized as referencing a shared metadata document, and the shared metadata repository in which the document is stored is identified. In one set of embodiments, the identification is based on configuration information that is associated with the software application. For example, the configuration information may indicate a name and/or location of the shared metadata repository. In additional embodiments, the identification is further based on the namespace of the metadata document. The structure and content of the configuration information is discussed in greater detail below with respect to FIG. 2.

Once the shared metadata repository has been identified, the metadata document is retrieved from the repository on behalf of the software application (step 106). In this manner, the software application (as well as any other application in the plurality of software applications) may access and reuse a single, shared copy of the metadata document. In some embodiments, the shared metadata document (or a metadata document referencing the shared metadata document) may need to be published for external consumption (i.e., for use by one or more external software applications that do not have access to a URL resolver performing the steps of flowchart 100). In these cases, the URL received in step 102 may be transformed into a standard HTTP URL that can be used by external software applications to retrieve the shared metadata document. This process of transforming URLs is discussed in greater detail below with respect to FIGS. 5 and 6.

It should be appreciated that the specific steps illustrated in FIG. 1 provide a particular method for facilitating the sharing of a metadata document according to an embodiment of the present invention. Other sequences of steps may also be performed according to alternative embodiments. For example, alternative embodiments of the present invention may perform the steps outlined above in a different order. Moreover, the individual steps illustrated in FIG. 1 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 2:
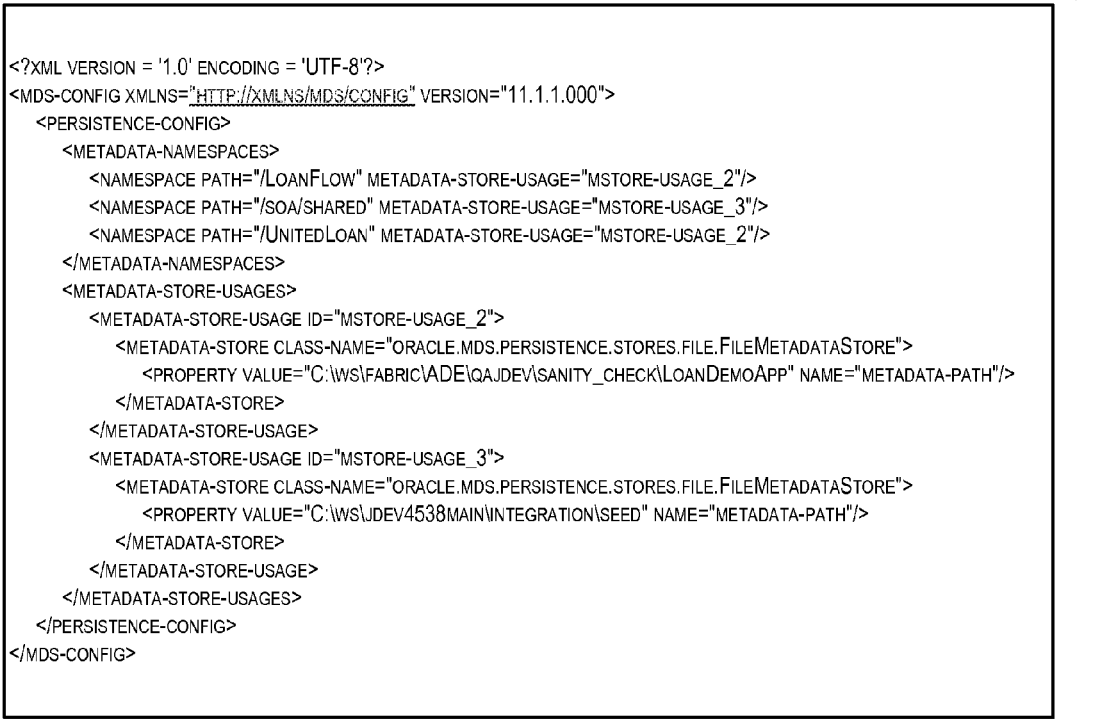
FIG. 2 is sample code illustrating configuration information that may be associated with a software application in accordance with an embodiment of the present invention.

FIG. 2 is sample code illustrating configuration information 200 that may be associated with a software application as described in flowchart 100 of FIG. 1. In an embodiment, each software application configured to make use of shared metadata is associated with its own configuration information/file. As shown, configuration information 200 may be formatted in a structured language such as Extensible Markup Language (XML). However, one of ordinary skill in the art will appreciate that configuration information 200 may be formatted in any standardized or proprietary manner.

Configuration information 200 is adapted to reference one or more shared metadata repositories that may be used to store a shared metadata document. For example, configuration information 200 identifies two metadata stores (i.e., repositories) "mstore-usage_2" and "mstore-usage_3," along with their physical addresses. The physical addresses may correspond to local or remote locations. Configuration information 200 may also include one or more namespace-to-repository mappings, such as the "metadata-namespaces" illustrated in FIG. 2. In some embodiments, these mappings may be used to determine a shared metadata repository for a metadata document based on its namespace. For example, configuration information 200 indicates that metadata documents having the namespace "/loan/flow" should be retrieved from "mstore-usage_2," and metadata documents having the namespace "/soa/shared" should be retrieved from "mstore-usage_3."

Although not shown, configuration information 200 may also include other information that is used to retrieve a shared metadata document on behalf of an associated software application. For example, configuration information 200 may include version information that identifies a particular version of the metadata document used by the application. Further, configuration information 200 may include customization information that identifies a particular customization (i.e., customized variant) of the metadata document used by the application. In this manner, various reusing applications may refer to a different version/customization of shared metadata. In a case wherein no versioning information for a metadata document is specified in the configuration information, the latest version of the metadata document may be automatically retrieved.

In some embodiments, configuration information 200 may be automatically generated by a development tool at design time of the associated software application. Further, the appropriate URLs for referencing shared metadata documents may be automatically created.

Figure 3:
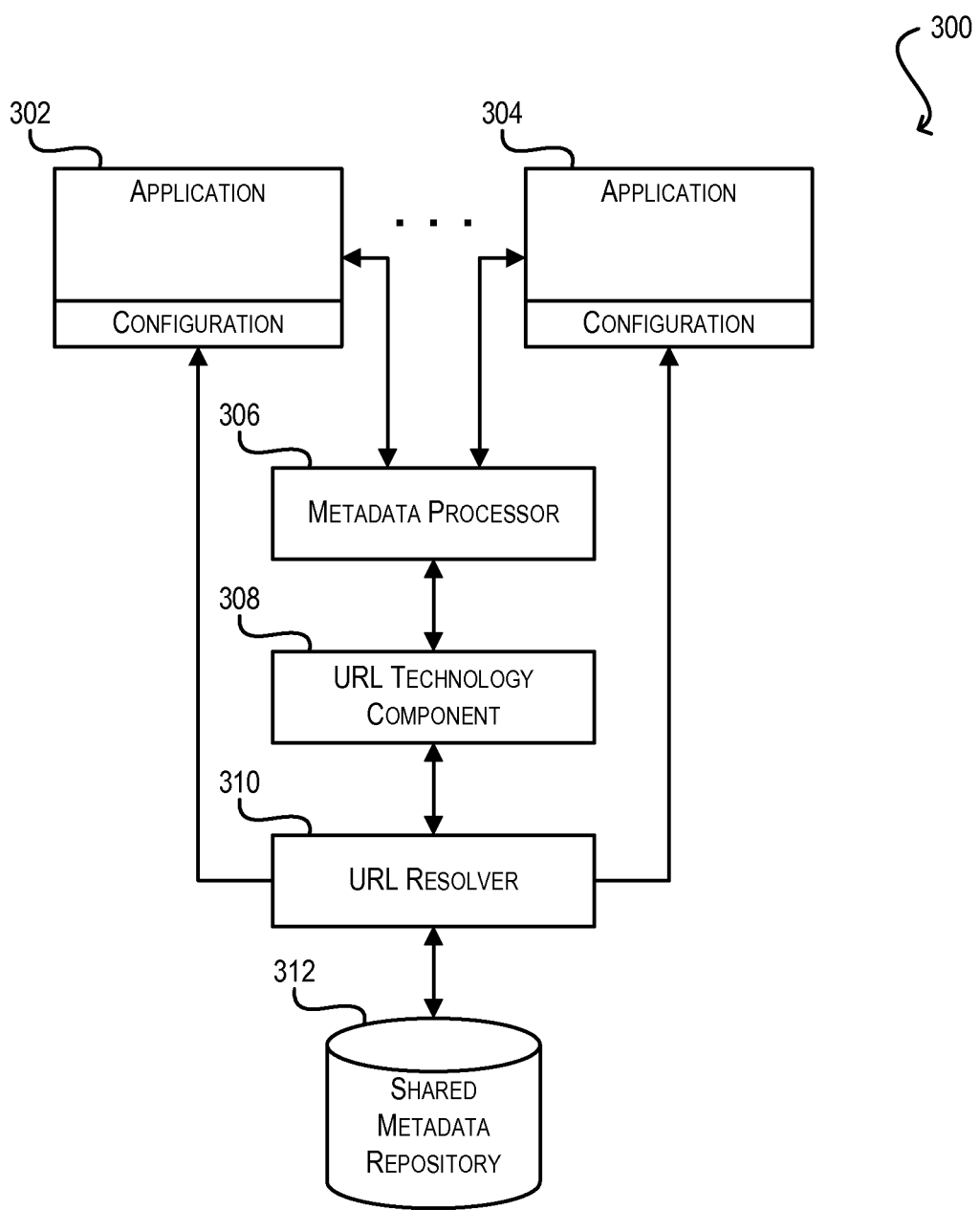
FIG. 3 is a simplified block diagram illustrating a system for facilitating the sharing of metadata in the context of a deployed environment in accordance with an embodiment of the present invention.

FIG. 3 is a simplified block diagram illustrating a system 300 for facilitating the sharing of a metadata document in the context of a deployed application environment according to an embodiment of the present invention. As shown, system 300 includes one or more deployed software applications 302, 304, a plurality of application framework components (e.g., metadata processor 306, URL technology component 308, URL resolver 310), and one or more shared metadata repositories 312. In one set of embodiments, applications 302, 304 are Java 2 Enterprise Edition (J2EE) applications, and application framework components 306, 308, 310 are Java-based components. Shared metadata repository 312 may correspond to either a database or file-based repository, but in a deployed environment it will commonly be a database. Although only one repository 312 and two applications 302, 304 are depicted, any number of repositories and applications may be supported.

In various embodiments, Applications 302, 304 are structured to include one or more metadata documents, such as WSDL or XML Schema Definition (XSD) documents. These metadata documents are, in turn, structured to include references to one or more shared metadata documents via URLs having the format described in flowchart 100 of FIG. 1.

At application runtime, the metadata documents included in an application 302, 304 are passed to metadata processor 306. Metadata processor 306 may be any conventional application framework component capable of parsing/processing structured metadata. In one embodiment, processor 306 is an XML parser/processor. As the metadata documents are being processed, the URLs included therein are passed to URL technology component 308. Like metadata processor 306, URL technology component 308 may be any conventional application framework component capable of processing standard URLs. In one embodiment, URL technology component 308 corresponds to an instance of the standard Java URLScheme class.

In various embodiments, the URLs from application 302, 304 are then passed from URL technology component 308 to URL resolver 310. Unlike metadata processor 306 and URL technology component 308, URL resolver 310 is a custom application framework component unique to embodiments of the present invention. Specifically, URL resolver 310 is a custom component adapted to resolve URLs for shared metadata documents in accordance with the steps of flowchart 100. For example, URL resolver 310 is configured to receive a metadata document URL having the specialized protocol name described with respect to flowchart 100 (e.g., "oraclemds"), and identify a shared metadata repository (e.g., 312) storing the metadata document based on configuration information associated with respective application 302, 304. The metadata document is then retrieved from the shared metadata repository on behalf of the application. In one embodiment, URL resolver 310 corresponds to a custom Java class that extends the standard URLScheme class.

Since URL resolver 310 interoperates with existing application framework components such as metadata processor 306 and URL technology component 308, embodiments of the present invention facilitate the sharing of metadata by a plurality of applications with minimal code changes to the applications and their underlying framework. Further, since URLs are dynamically resolved using configuration information (rather than being statically defined), the shared metadata repository can be moved from one physical location to another without requiring changes to the URLs.

In some embodiments, URL resolver 310 may be configured to automatically resolve relative URLs (i.e., URLs that do not include any protocol name) in shared metadata documents. Thus, for example, if a first shared metadata document "foo/mydoc1.xsd" references a second shared metadata document via a relative URL (such as "shared/mydoc2.xsd"), the second shared metadata document will be automatically retrieved as "oraclemds://foo/shared/mydoc2.xsd."

Figure 4:
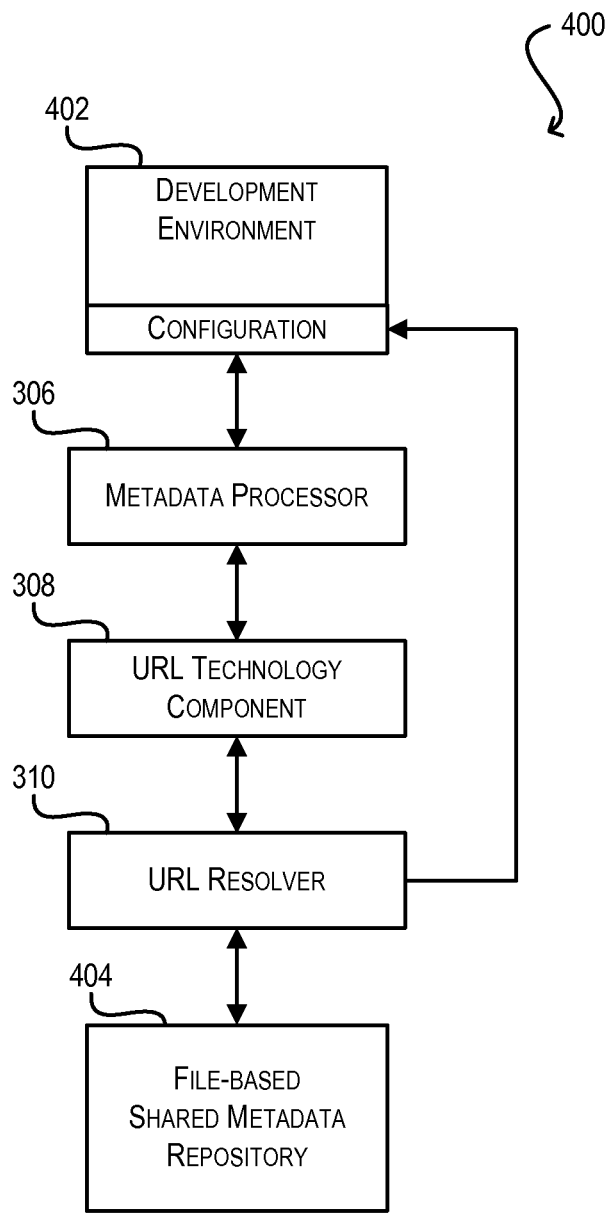
FIG. 4 is a simplified block diagram illustrating a system of facilitating the sharing of metadata in the context of a development environment in accordance with an embodiment of the present invention.

As discussed previously, the sharing techniques of the present invention may be used throughout the lifecycle of an application. For example, these techniques may be used while an application is still in development. FIG. 4 is a simplified block diagram illustrating a system 400 for facilitating the sharing of a metadata document in the context of an application development environment according to an embodiment of the present invention. Specifically, FIG. 4 illustrates an application being developed in a development environment 402, wherein development environment 402 is configured to run the application with the help of application framework components 306, 308, 310 and a shared metadata repository 404. In this example, components 306, 308, 310 are identical to the similarly numbered components of FIG. 3. Shared metadata repository 404 may correspond to either a database or file-based repository, but in a development context it will commonly be file-based.

As with applications 302, 304 of FIG. 3, the application being developed in development environment 402 is structured to include one or more metadata documents which are, in turn, structured to include references to one or more shared metadata documents via URLs having the format described in flowchart 100 of FIG. 1.

When the application is executed in development environment 402, the URLs included therein are passed through standard components 306, 308 as described above for FIG. 3. The URLs are then received at custom URL resolver 310, which is configured to identify a shared metadata repository (e.g., 404) for the referenced metadata documents based on configuration information. In one embodiment, the configuration information is associated with development environment 402, such that the configuration information is common to all applications executed in the development environment. In other embodiments, the configuration information is specific to the application presently running in the development environment. Once the shared metadata repository is identified, the shared metadata documents are retrieved on behalf of the application.

In one set of embodiments, development environment 402 may be configured to automatically generate configuration information (such as configuration information 200 of FIG. 2) for an application, as well as verifying that URLs for shared metadata documents include the specialized protocol name described in step 102 of flowchart 100. Once the application is deployed, no further changes need to be made to the URLs; only the configuration information needs to be modified to point to the deployed location of the shared metadata repository.

Figure 5:
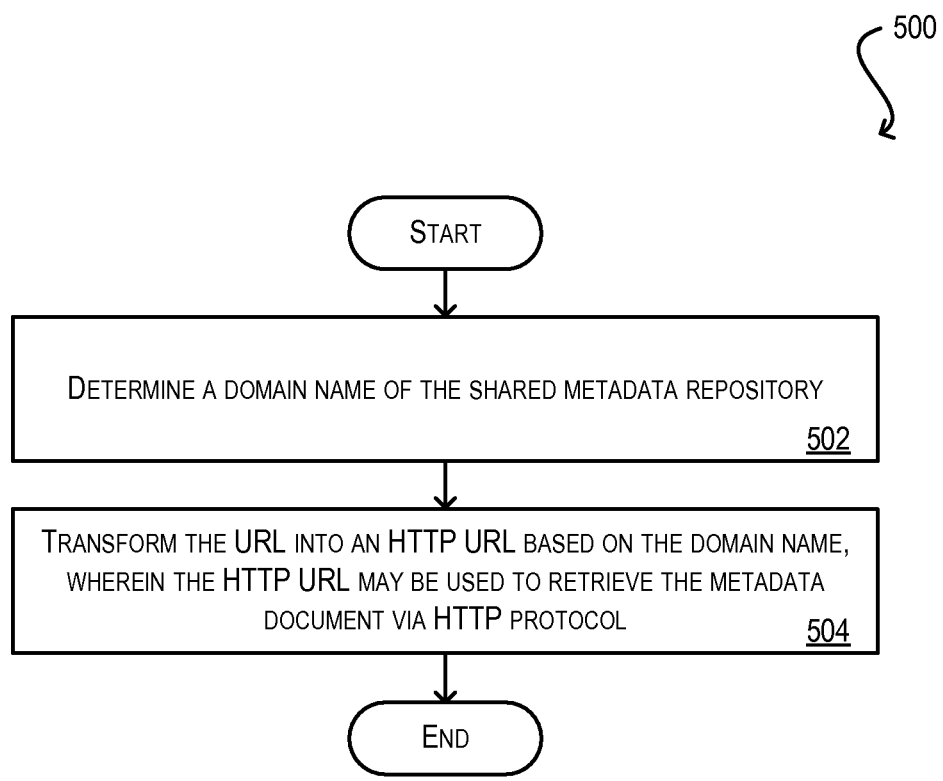
FIG. 5 is a flowchart illustrating additional steps that may be performed in facilitating the sharing of metadata in accordance with an embodiment of the present invention.

FIG. 5 is a flowchart 500 illustrating further steps that may be performed in facilitating the sharing of metadata in accordance with an embodiment of the present invention. Specifically, flowchart 500 illustrates the steps performed in converting a URL for a shared metadata document into a standard HTTP URL. This enables external applications (i.e., applications that do not have access to URL resolver 310 of FIG. 3) to retrieve the shared metadata document. The processing of flowchart 500 may be performed, for example, when a metadata document referencing a shared metadata document is accessed by an external application. Alternatively, the processing of flowchart 500 may be performed when the shared metadata document itself is directly accessed by the external application.

Assuming that steps 102 and 104 of flowchart 100 have been executed, a domain name for the shared metadata repository identified in step 104 is determined (step 502). In one embodiment, the domain name corresponds to a network address of a web server configured to serve data stored in the repository. The URL received at step 102 is then transformed into a standard HTTP URL based on the domain name (step 504). For example, the URL "oraclemds://soa/shared/mydoc.xml" may be transformed into "http://mds1/soa/shared/mydoc.xml," where "mds1" is the domain name determined at step 502. This HTTP URL may then be used to retrieve "mydoc.xml" using standard HTTP protocol.

Figure 6:
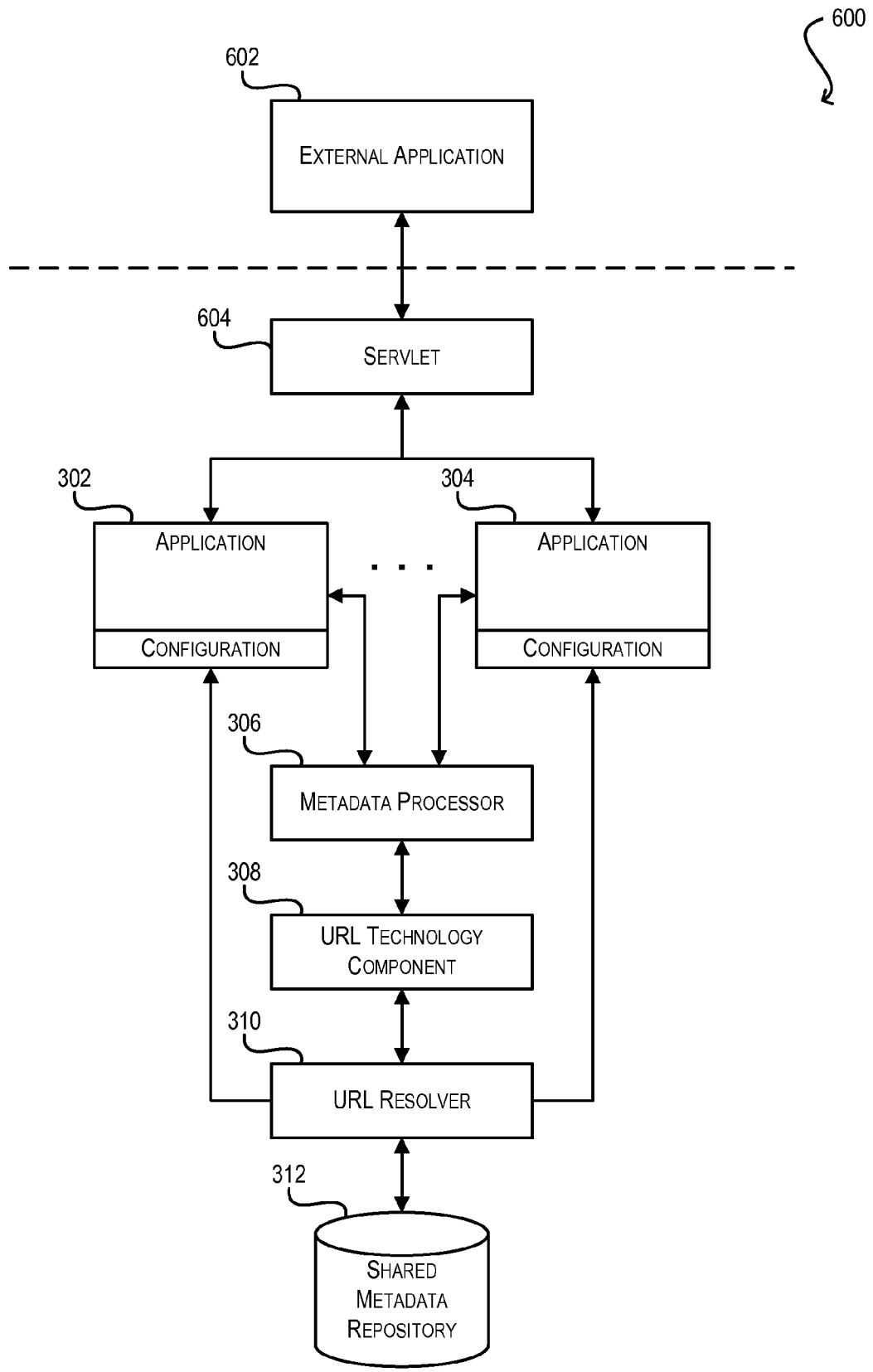
FIG. 6 is a simplified block diagram illustrating a system for facilitating the sharing of metadata by internal and external applications in accordance with an embodiment of the present invention.

FIG. 6 is a simplified block diagram illustrating a system 600 configured to implement the processing of flowcharts 100 and 500 to facilitate the sharing of metadata with external applications. As shown, system 600 includes one or more external applications 602 in communication with a servlet 604. Servlet 604 is communicatively coupled with internal applications 302, 304, application framework components 306, 308, 310, and a shared metadata repository 312. Servlet 604 is configured to publish metadata stored in shared metadata repository 312 to external applications 602. For example, servlet 604 may publish a WSDL file for a web service used by the external applications. However, since external applications 602 do not have direct access to URL resolver 310, the metadata published by servlet 604 may include shared metadata URLs (e.g., "oraclemds" URLs) that cannot be resolved by the external applications.

To address the above problem, servlet 604 is configured to pass the shared metadata URLs to URL resolver 310 via an appropriate internal application 302, 304 and application framework components 306, 308. In response, URL resolver 310 is configured to perform the processing of flowcharts 100 and 500 to transform the URLs into standard HTTP URLs. The standard HTTP URLs are then passed back to servlet 604, which publishes the standard HTTP URLs to external applications 602. In this manner, embodiments of the present invention allow internal applications to make use of the specialized URL protocol described herein to share metadata documents, while maintaining interoperability with external applications.

Figure 7:
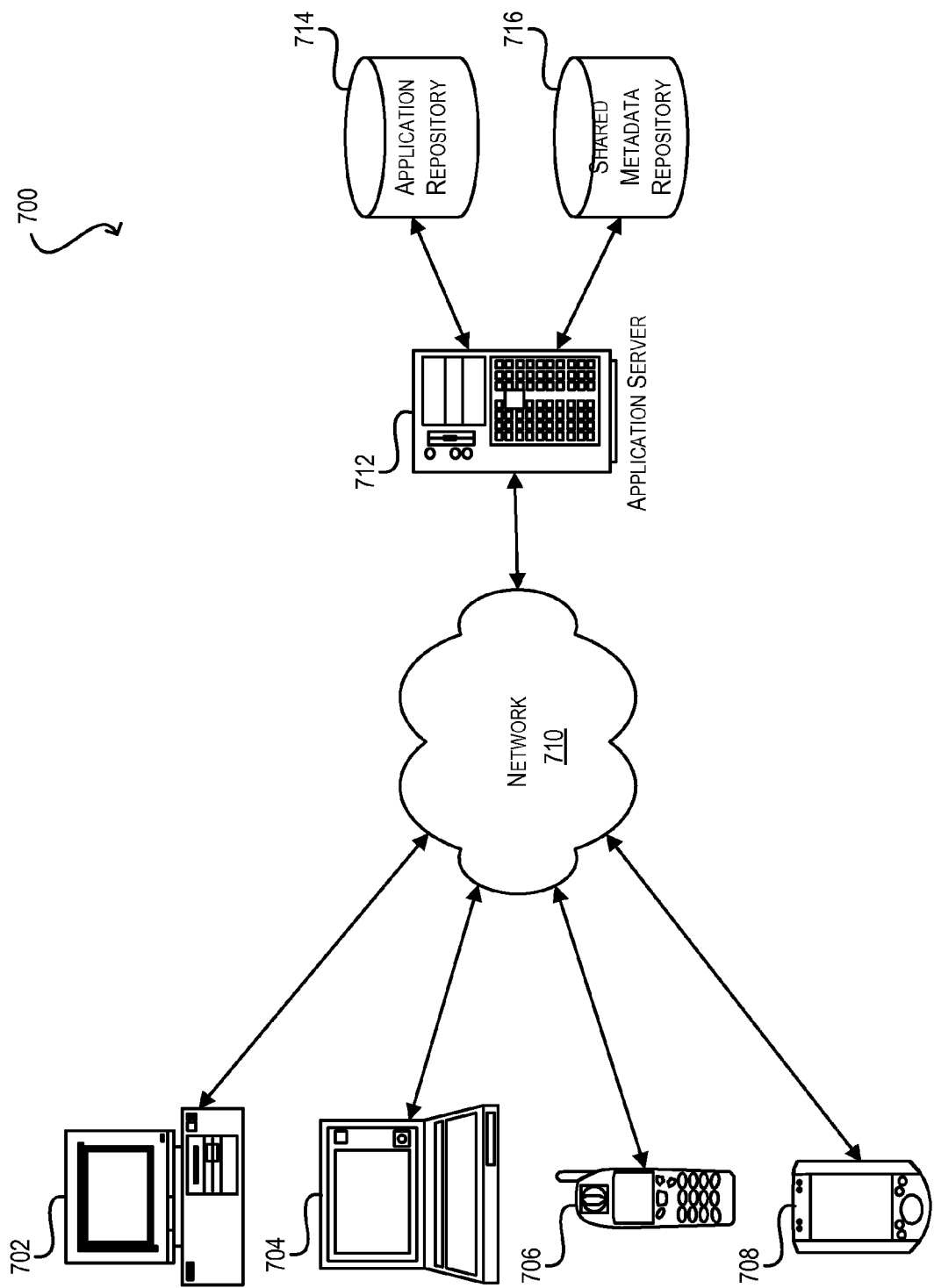
FIG. 7 is a simplified block diagram of a system environment that may be used in accordance with an embodiment of the present invention.

FIG. 7 is a simplified block diagram illustrating components of a system environment 700 that may be used in accordance with an embodiment of the present invention. As shown, system environment 700 includes one or more client computing devices 702, 704, 706, 708, which are configured to operate a client application such as a web browser, proprietary client (e.g., Oracle Forms), or the like. In various embodiments, client computing devices 702, 704, 706, 708 may be used to interact with one or more software applications, such as applications 302, 304 of FIG. 3.

Client computing devices 702, 704, 706, 708 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, 708 may be any other electronic device, such as a thin-client computer, Internet-enabled gaming system, and/or personal messaging device, capable of communicating over a network (e.g., network 710 described below). Although system environment 700 is shown with four client computing devices, any number of client computing devices may be supported.

In most embodiments, system environment 700 includes a network 710. Network 710 may be any type of network familiar to those skilled in the art that can support data communications using any of a variety of commercially-available protocols, including without limitation TCP/IP, SNA, IPX, AppleTalk, and the like. Merely by way of example, network 710 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 700 also includes one or more server computers 712 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to an application server configured to execute one or more applications such as applications 302, 304 of FIG. 3. Further, server 712 may be configured to execute one or more application framework components, such as URL resolver 310 of FIG. 3. In alternative embodiments, URL resolver 310 and applications 302, 304 may be run on separate machines.

Server 712 may run an operating system including any of those discussed above, as well as any commercially available server operating system. Server 712 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 700 may also include one or more data repositories 714, 716. For instance, data repositories 714, 716 may include one or more application repositories 714 configured to store transactional data for applications hosted on server 712, and one or more shared metadata repositories 716 such as repository 312 of FIG. 3. Data repositories 714, 716 may reside in a variety of locations. By way of example, one or more of data repositories 714, 716 may reside on a storage medium local to (and/or resident in) server 712. Alternatively, data repositories 714, 716 may be remote from server 712, and in communication with server 712 via a network-based or dedicated connection. In one set of embodiments, data repositories 714, 716 may reside in a storage-area network (SAN) familiar to those skilled in the art. Similarly, any necessary files for performing the functions attributed to server 712 may be stored locally on server 712 and/or remotely, as appropriate. In one set of embodiments, data repositories 714, 716 may include file-based repositories. In another set of embodiments, data repositories 714, 716 may include relational databases, such as Oracle 10g, that are adapted to store, update, and retrieve data in response to SQL-formatted commands.

Figure 8:
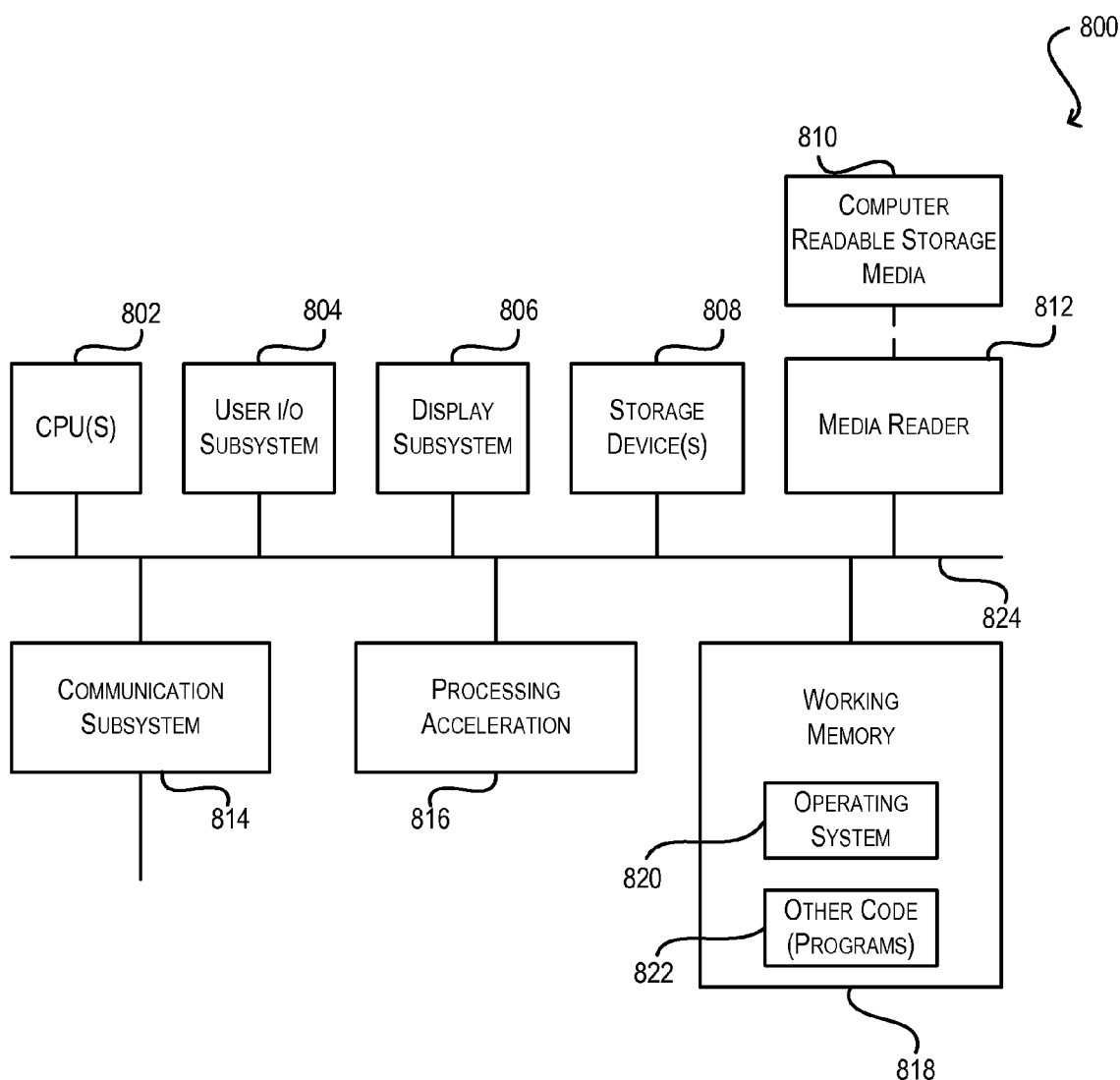
FIG. 8 is a simplified block diagram of a computer system that may be used in accordance with an embodiment of the present invention.

FIG. 8 illustrates an exemplary computer system 800 that may be used in accordance with embodiments of the present invention. In various embodiments, system 800 may be used to implement any of the computers 702, 704, 706, 708, 712 described above. Computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). Computer system 800 may also include one or more storage devices 808. By way of example, storage device(s) 808 may include devices such as disk drives, optical storage devices, and solid-state storage devices such as a random access memory (RAM) and/or a read-only memory (ROM), which can be programmable, flash-updateable and/or the like.

Computer system 800 may additionally include a computer-readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage device (s) 808) comprehensively representing remote, local, fixed, and/or removable storage devices plus storage media for temporarily and/or more permanently containing computer-readable information. Communications system 814 may permit data to be exchanged with network 710 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In an exemplary embodiment, working memory 818 may include executable code and associated data structures (such as caches) for executing the processing of flowcharts 100 and 500 of FIGS. 1 and 5. It should be appreciated that alternative embodiments of computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, o r other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

While the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for facilitating the sharing of a metadata document by a plurality of software applications, the method comprising:
   receiving, from a software application of the plurality of software applications, a uniform resource locator (URL) for the metadata document, the URL including a protocol component identifying a specialized protocol name and a path component identifying a name and namespace of the metadata document, the specialized protocol name indicating that the metadata document is stored in a shared metadata repository;
   wherein the specialized protocol name is a non-standard protocol name that is not one of HTTP, HTTPS, FILE, or FTP; and
   identifying the shared metadata repository based on the specialized protocol name;
   identifying the metadata document further based on configuration information associated with the software application.

2. The method of claim 1 further comprising retrieving the metadata document from the shared metadata repository.

3. The method of claim 2, wherein the configuration information includes version information indicating a specific version of the metadata document used by the software application, and wherein retrieving the metadata document comprises retrieving the specific version.

4. The method of claim 2, wherein the configuration information includes customization information indicating a specific customized variant used by the metadata document for the software application, and wherein retrieving the metadata document comprises retrieving the specific customized variant.

5. The method of claim 1, wherein identifying the shared metadata repository is further based on the namespace of the metadata document.

6. The method of claim 1, wherein the steps of receiving the URL and identifying the shared metadata repository are performed by a URL resolver configured to interoperate with a standard URL technology component, the standard URL technology component processes URLs on behalf of the plurality of software applications.

7. The method of claim 6, wherein the plurality of applications include Java 2 Enterprise Edition (J2EE) applications, and wherein the standard URL technology component is a standard Java URL class.

8. The method of claim 7, wherein the URL resolver is a custom Java class that extends the standard Java URL class.

9. The method of claim 1, wherein the steps of receiving the URL and identifying the shared metadata repository are performed while the application is running in a deployed environment.

10. The method of claim 9, wherein the shared metadata repository is a database repository.

11. The method of claim 1, wherein the steps of receiving the URL and identifying the shared metadata repository are performed while the software application is running in a development environment.

12. The method of claim 11, wherein the shared metadata repository is a file-based repository.

13. The method of claim 1, wherein the metadata document is an Extensible Markup Language (XML) document.

14. The method of claim 1 further comprising:
  determining a domain name of the shared metadata repository; and
  transforming the URL into a HyperText Transfer Protocol (HTTP) URL based on the domain name, wherein the HTTP URL may be used to retrieve the metadata document via HTTP protocol.

15. A system for facilitating the sharing of a metadata document by a plurality of software applications, the system comprising:
  a memory storing configuration information associated with the plurality of software applications;
  a processor coupled to the memory configured to:
    receive, from a software application in the plurality of software applications, a uniform resource locator (URL) for the metadata document, the URL including a protocol component identifying a specialized protocol name and a path component identifying a name and namespace of the metadata document, the specialized protocol name indicating that the metadata document is stored in a shared metadata repository; and
    wherein the specialized protocol name is a non-standard protocol name that is not one of HTTP, HTTPS, FILE, or FTP; and
    identify the shared metadata repository based on the specialized protocol name; and
    identify the metadata document based on configuration information associated with the software application.

16. The system of claim 15, wherein the processor is further configured to retrieve the metadata document from the shared metadata repository.

17. The system of claim 15, wherein identifying the shared metadata repository is further based on the namespace of the metadata document.

18. The system of claim 15, wherein the processor is further configured to:
  determine a domain name of the shared metadata repository; and
  transform the URL into a HyperText Transfer Protocol (HTTP) URL based on the domain name, wherein the HTTP URL may be used to retrieve the metadata document via HTTP protocol.

19. A non-transitory machine-readable storage medium storing a series of instructions which, when executed by a processing component, cause the processing component to:
  receive, from a software application in a plurality of software applications, a uniform resource locator (URL) for a metadata document, the URL including a protocol component identifying a specialized protocol name and a path component identifying a name and namespace of the metadata document, the specialized protocol name indicating that the metadata document is stored in a shared metadata repository; and
  wherein the specialized protocol name is a non-standard protocol name that is not one of HTTP, HTTPS, FILE, or FTP; and
  identify the shared metadata repository based on the specialized protocol name; and
  identify the metadata document based on configuration information associated with the software application.

20. The machine-readable medium of claim 19, wherein the series of instructions further cause the processing component to retrieve the metadata document from the shared metadata repository.

21. The machine-readable medium of claim 19, wherein identifying the shared metadata repository is further based on the namespace of the metadata document.

22. The machine-readable medium of claim 19, wherein the series of instructions further cause the processing component to:
  determine a domain name of the shared metadata repository; and
  transform the URL into a HyperText Transfer Protocol (HTTP) URL based on the domain name, wherein the HTTP URL may be used to retrieve the metadata document via HTTP protocol.

* * * * *

UNITED STATES PATENT AND TRADEMARK OFFICE
CERTIFICATE OF CORRECTION

PATENT NO. : 8,667,031 B2  
APPLICATION NO. : 12/138997  
DATED : March 4, 2014  
INVENTOR(S) : Konduri et al.

Page 1 of 1

It is certified that error appears in the above-identified patent and that said Letters Patent is hereby corrected as shown below:

In the Drawings

On Sheet 1 of 8, in figure 1, under Reference Numeral 102, line 4, delete "INDENTIFYING" and insert -- IDENTIFYING --, therefor.

In the Specification

Column 6, line 1, delete "(i. e.," and insert -- (i.e., --, therefor.

Column 11, line 60, delete "o r" and insert -- or --, therefor.

Signed and Sealed this
Sixteenth Day of September, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,667,031 B2 | Page 1 of 1 |
| APPLICATION NO. | : 12/138997 | |
| DATED | : March 4, 2014 | |
| INVENTOR(S) | : Konduri et al. | |

It is certified that error appears in the above-identified patent and that said Letters Patent is hereby corrected as shown below:

On the title page, in the illustrative figure, Reference Numeral 102, line 4 "INDENTIFYING" should read -- IDENTIFYING --.

In the Drawings

On Sheet 1 of 8, in figure 1, under Reference Numeral 102, line 4, delete "INDENTIFYING" and insert -- IDENTIFYING --, therefor.

In the Specification

Column 6, line 1, delete "(i. e.," and insert -- (i.e., --, therefor.

Column 11, line 60, delete "o r" and insert -- or --, therefor.

This certificate supersedes the Certificate of Correction issued September 16, 2014.

Signed and Sealed this
Fourteenth Day of October, 2014

Michelle K. Lee
*Deputy Director of the United States Patent and Trademark Office*